Sept. 8, 1959 G. S. KNAPP 2,903,121
DINNERWARE MAKING APPARATUS
Original Filed Dec. 12, 1955 3 Sheets-Sheet 3
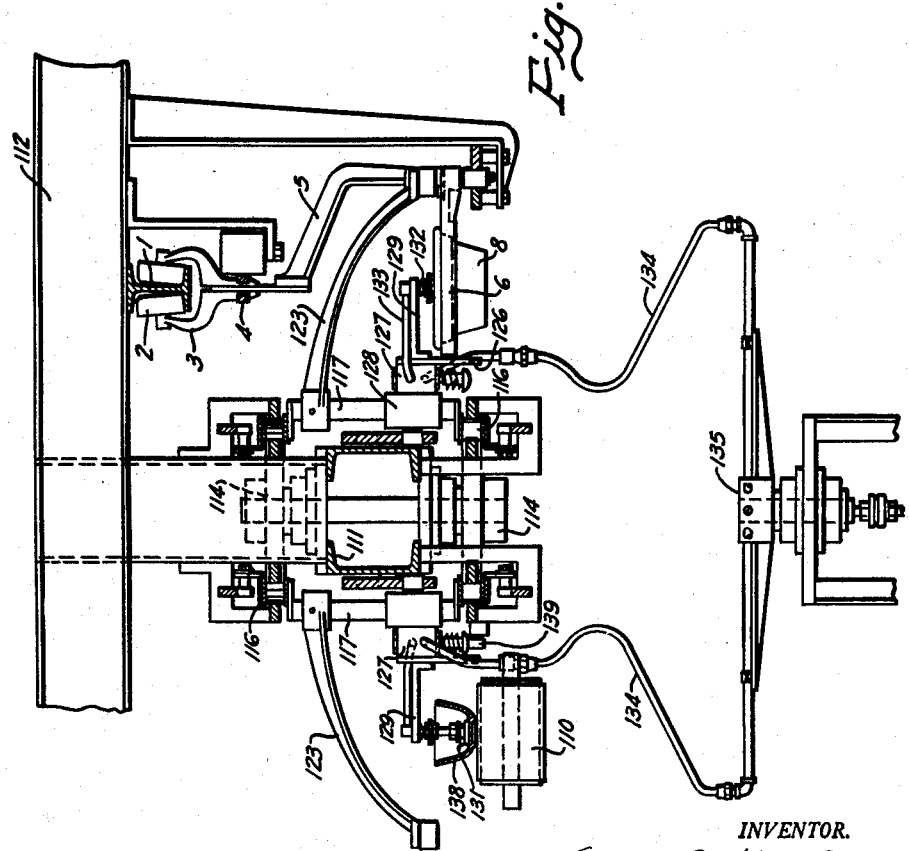
INVENTOR.
GEORGE S. KNAPP
BY
Brown, Critchlow, Flick & Peckham
HIS ATTORNEYS United States Patent Office 2,903,121
Patented Sept. 8, 1959

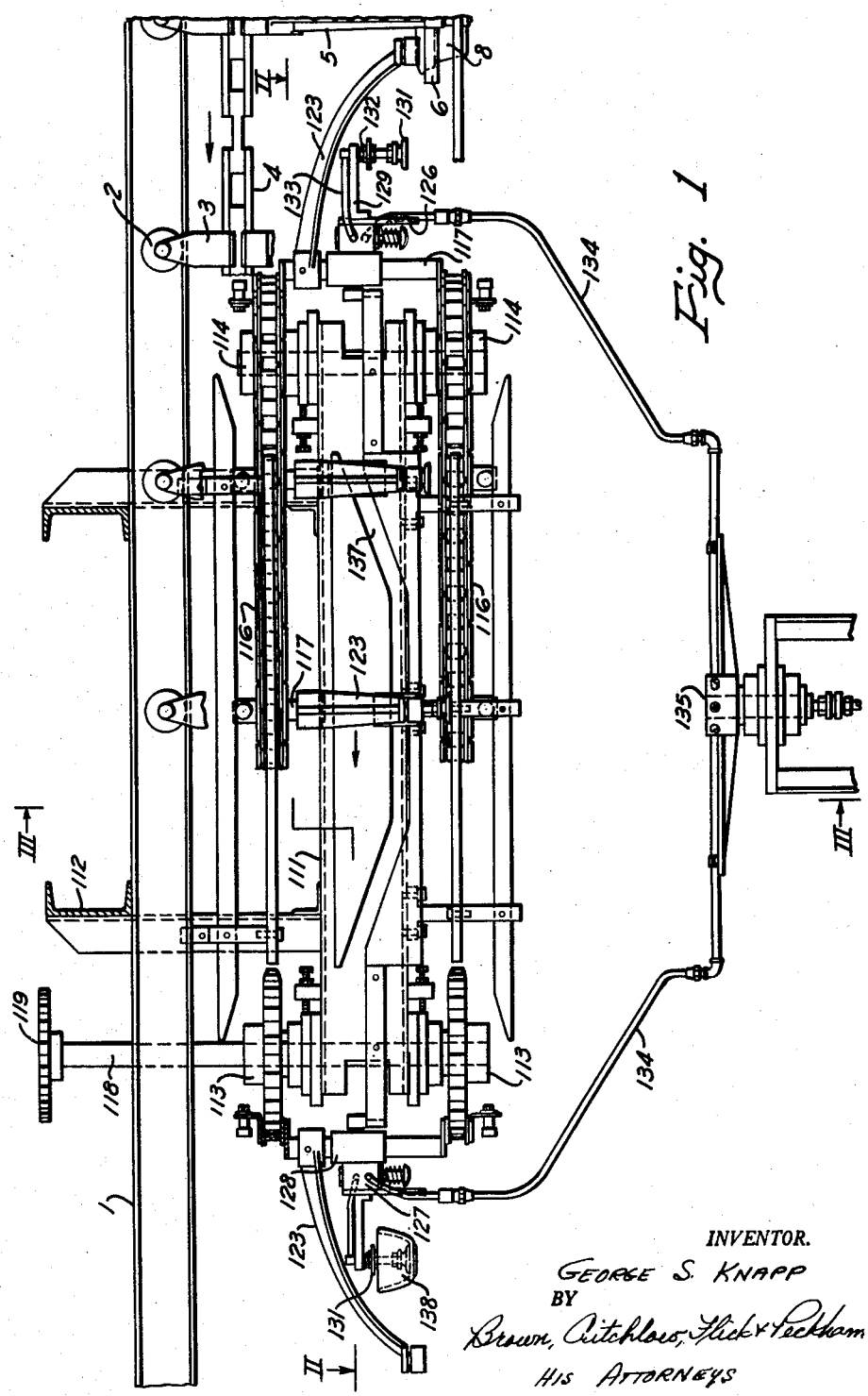

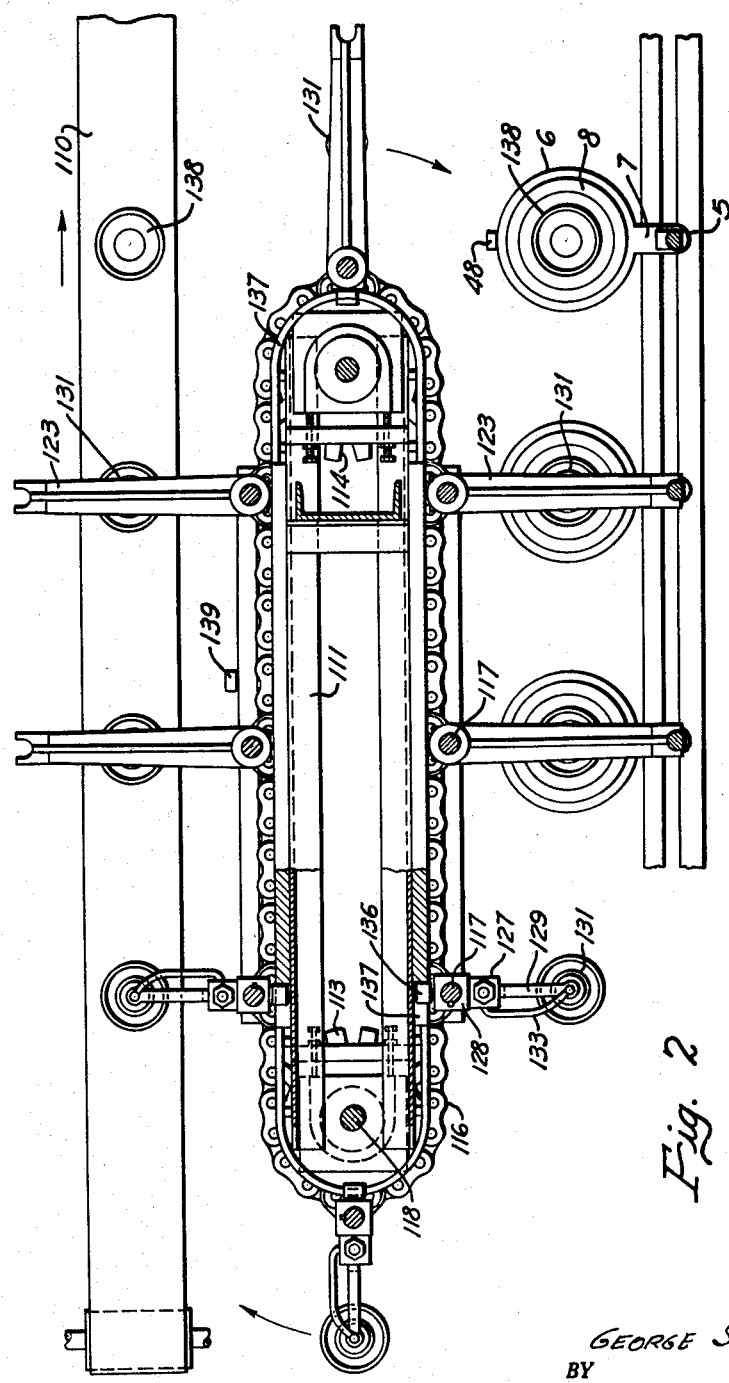

2,903,121

DINNERWARE MAKING APPARATUS

George S. Knapp, Newell, W. Va., assignor to The Homer Laughlin China Company, Newell, W. Va., a corporation of Delaware Original application December 12, 1955, Serial No. 552,520. Divided and this application March 6, 1957, Serial No. 644,307

6 Claims. (Cl. 198—20)

This invention relates to apparatus for making ceramic dinnerware, and more particularly to a machine for removing dried ware from conveyor molds traveling past it. This application is a division of my copending patent application, Serial No. 552,520, filed December 12, 1955.

It is among the objects of this invention to provide a mold-stripping machine, which is entirely automatic, which can be operated at high speed, and which safely handles the ware that it removes from the molds.

The preferred embodiment of the invention is illustrated in the accompanying drawings, in which Fig. 1 is a side view of the machine, partially broken away in section;

Fig. 2 is a horizontal section taken on the line II—II of Fig. 1 and

Fig. 3 is a vertical section taken on the line III—III of Fig. 1, but showing a mold about to have its cup removed.

According to this invention, an endless overhead chain conveyor for molds travels through a clay charging machine and then a jigger machine and a drying chamber. The conveyor then travels past a mold stripper, where ware is removed from the molds. From there the conveyor loops around and finally returns to the mold charger. The overhead conveyor consists of three main parts, an endless track, trolleys running on the track, and an endless chain connected to the trolleys for moving them. As shown in Figs. 1 and 3, an I-beam 1 makes a good track and, due to the construction of this conveyor, the track can be curved both horizontally and vertically to suit local conditions and it also can be of any length desired. It is supported from above in any suitable manner. Each trolley has a pair of wheels 2 supported by the lower flanges of the track. The wheels are rotatably mounted in the upper ends of forked members 3, which hang down below the center of the track. Alternate links of the conveyor chain 4 are provided with vertical longitudinal slots, through some of which the trolley forks extend. The side faces of the forks are slotted to receive the links to support the chain. When the chain travels forward, it pulls all of the trolleys along the track with it. Rigidly connected to the lower end of each trolley is the upper end of an arm 5, which extends laterally and then downward. Directly below each trolley is a horizontal ring 6 provided with a radial projection 7 supported by the lower end of the adjoining arm. The rings support molds 8, in or on which dinnerware is formed from ceramic material. For the purpose of illustration, cup molds are shown.

The conveyor drive (not shown) is supported beside the conveyor chain in any suitable manner. It is constructed and operates in the same general manner as the conveyor drive shown in Fig. 8 of Patent 2,555,227, and since it forms no particular part of this invention it will not be described here.

The conveyor, carrying empty molds, travels past a mold charger where cylindrical slugs of clay are deposited in the molds and then the charged molds are conveyed to an automatic jigger. From the jigger machine, the molds with the newly jiggered cups therein are conveyed through the drier to dry the cups in the usual manner. The conveyor then carries the cups past the stripper, where they are removed from the molds and deposited on an endless conveyor belt 110 that conveys them to a suitable location for further operations, such as handle attaching. The stripper includes certain elements that travel in an endless path alongside the conveyor and lift the cups out of the molds and then, on the opposite side of the machine, deposit the cups on conveyor 110.

The frame 111 of the stripper is suspended from a pair of overhead beams 112 and has pairs of vertically spaced horizontal sprockets 113 and 114 at its front and rear ends. These sprockets are connected by upper and lower endless chains 116 which are connected at intervals by vertical shafts 117. The front pair of sprockets 113 is driven through a vertical shaft 118 from an upper sprocket 119, which in turn is driven by any suitable driving means that will cause the chains 116 to travel at the same speed as the mold conveyor beside them. Rigidly mounted on the upper part of each shaft 117 is a long arm 123 that curves outward and downward to a forked end for engaging the lower part of a conveyor arm 5 to thereby hold the adjoining mold steady as it moves alongside the stripper. The roller 48 on the mold ring 6 is straddled by a vertical fork 126 depending from a valve 127 secured to a sleeve 128 splined on one of the shafts 117. Extending outward from each valve is an arm 129, in the outer end of which the hollow stem of a horizontal diaphragm 131 is slidably mounted. The diaphragm is pressed downward by a coil spring 132. There is a hole through the center of the diaphragm that is connected through its stem with a flexible tube 133 that leads to the adjoining valve. The valve is also connected by a hose 134 with a rotary distributor 135 that is connected with a vacuum pump (not shown). The distributor connects the pump with the hoses 134 only on the side of the stripper where the cups are picked up.

As the diaphragms are carried around the stripper, they move down and up at certain points. This movement is controlled by rollers 136 projecting from sleeves 128 and riding on a cam track 137. At the opposite sides of the stripper, the tracks are inclined down to horizontal lower levels. This causes the diaphragms to move down into the molds on the chain conveyor, and the timing is such that each diaphragm will be pressed down against the bottom of a cup 138 in one of the molds. As this occurs, the air pressure in the cup is reduced because the diaphragm is in communication with the vacuum pump. The diaphragm and cup then are raised by the inclined cam track and carried around to the opposite side of the stripper, where they again move down toward an endless conveyor belt 110 extending along the side of the stripper. When the cup is a short distance above the belt, the valve is tripped by passing over a fixed roller 139 to admit atmospheric pressure to the diaphragm so that the cup will be released from it and drop onto the belt. In this way, each mold is relieved of its cup, which then is deposited on the conveyor belt 110 for transportation to another location.

From the stripper, the conveyor returns empty molds to the mold charger to repeat the cup forming cycle that has just been described.

According to the provisions of the patent statutes, I have explained the principle of my invention and have illustrated and described what I now consider to represent its best embodiment. However, I desire to have it understood that, within the scope of the appended claims, the invention may be practiced otherwise than as specifically illustrated and described.

I claim:

1. A dinnerware mold stripping machine for removing dried ware from molds traveling past it continuously, comprising a moving conveyor, a pair of endless chains traveling in vertically spaced horizontal paths beside said conveyor, a plurality of vertical shafts supported at top and bottom by said chains at regularly spaced intervals, a slide mounted on each shaft and movable vertically thereon, a suction member carried by each slide laterally outside of said paths, a track between the chains positioned to be encircled by said slides as they are carried around it by the chains, means on the slides traveling along the track for supporting the slides, the track being shaped to move each successive slide first downward to cause its suction member to engage ware on one of said molds and then upward and later downward toward said conveyor and upward again, means for producing suction at said suction members so that they will grip and lift ware from the molds, and means for releasing the suction when the suction members are over said conveyor to deposit ware on it.

2. A dinnerware mold stripping machine for removing dried ware from molds traveling past it continuously, comprising a moving conveyor, a pair of endless chains traveling in vertically spaced horizontal paths beside said conveyor, a plurality of vertical shafts supported at top and bottom by said chains at regularly spaced intervals, a slide mounted on each shaft and movable vertically thereon, a suction member carried by each slide laterally outside of said paths, a valve supported by each slide, means for operatively connecting each valve with the adjoining suction member and a source of suction, a track between the chains positioned to be encircled by said slides as they are carried around it by the chains, means on the slides traveling along the track for supporting the slides, the track being shaped to move each successive slide first downward to cause its suction member to engage ware on one of said molds and then upward and later downward toward said conveyor and upward again, said valves connecting said source with the suction members over the molds to lift ware from the molds, and means engaged by the valves while they are passing conveyor to admit air to said suction members, whereby to release ware from the suction members onto the conveyor.

3. A dinnerware mold stripping machine for removing dried ware from molds traveling past it continuously, comprising a moving conveyor, a pair of endless chains traveling in vertically spaced horizontal paths beside said conveyor, a plurality of vertical shafts supported at top and bottom by said chains at regularly spaced intervals, a slide mounted on each shaft and movable vertically thereon, a valve and arm projecting laterally outward from each slide, a vertical hollow stem slidably mounted in the outer end of the arm, a suction cup on the lower end of the stem and having an opening communicating with said lower end, conduits for operatively connecting the valve with the stem and a source of suction, a track between the chains positioned to be encircled by said slides as they are carried around it by the chains, means on the slides traveling along the track for supporting the slides, the track being shaped to move each successive slide first downward to cause its suction member to engage ware on one of said molds and then upward and later downward toward said conveyor and upward again, the valves connecting said source with the suction cups over the molds, and means engaged by the valves as they pass said conveyor to open them to atmosphere, whereby to release ware from the suction cups onto the conveyor.

4. A dinnerware mold stripping machine for removing dried ware from molds traveling past it continuously, comprising a moving conveyor, a pair of endless chains traveling in vertically spaced horizontal paths beside said conveyor, a plurality of vertical shafts supported at top and bottom by said chains at regularly spaced intervals, a slide mounted on each shaft and movable vertically thereon, a suction member carried by each slide laterally outside of said paths, a valve supported by each slide, a tube connecting each valve with the adjoining suction member, a rotary distributor connected with a source of suction, conduits connecting the distributor to the valves, a track between the chains positioned to be encircled by said slides as they are carried around it by the chains, means on the slides traveling along the track for supporting the slides, the track being shaped to move each successive slide first downward to cause its suction member to engage ware on one of said molds and then upward and later downward toward said conveyor and upward again, said distributor being formed to connect said source of suction with only the conduits leading to the valves adjacent the molds, said last-mentioned valves connecting the conduits with the suction members over the molds, and means engaged by the valves as they pass said conveyor to admit air to the suction members, whereby to release ware from the suction members onto the conveyor.

5. The combination with a dinnerware mold carrier having suspended mold-supporting rings provided with radial projections, and a conveyor for ware, of a mold stripping machine for removing dried ware from the molds and depositing it on the conveyor, said machine comprising a pair of endless chains traveling in vertically spaced horizontal paths between said molds and conveyor, a plurality of vertical shafts connected at top and bottom to said chains at regularly spaced intervals, a slide mounted on each shaft and movable vertically thereon, a suction member carried by each slide laterally outside of said paths, a track positioned to be encircled by said slides as they are carried around it by the chains, means on the slides traveling along the track for supporting the slides, the track being shaped to move each successive slide first downward to cause its suction member to engage ware on one of said molds and then upward and later downward toward said conveyor and upward again, means for producing suction at said suction members so that they will grip and lift ware from the molds, means for releasing the suction when the suction members are over said conveyor to deposit ware on it, and forked members carried by said slides for straddling said ring projections when the slides move downward toward the molds, whereby to steady the rings passing by the machine.

6. The combination with a dinnerware mold carrier having mold-supporting rings suspended by arms from an endless carrier, and a conveyor for ware, of a mold stripping machine for removing dried ware from the molds and depositing it on the conveyor, said machine comprising a pair of endless chains traveling in vertically spaced horizontal paths between said molds and conveyor, a plurality of vertical shafts connected at top and bottom to said chains at regularly spaced intervals, bracing arms secured at one end to the shafts and having their opposite end shaped to engage and steady the ring-carrier arms, passing the machine, a slide mounted on each shaft below the adjoining bracing arm and movable vertically on the shaft, a suction member carried by each slide laterally outside of said paths, a track positioned to be encircled by said slides as they are carried around it by the chains, means on the slides traveling along the track for supporting the slides, the track being shaped to move each successive slide first downward to cause its suction member to engage ware on one of said molds and then upward and later downward toward said conveyor and upward again, means for producing suction at said suction members so that they will lift ware from the molds, and means for releasing the suction when the suction members are over said conveyor to deposit ware on it.

References Cited in the file of this patent
UNITED STATES PATENTS

| | | |
|---|---|---|
| 2,359,433 | McNamara | Oct. 3, 1944 |
| 2,611,493 | Nordquist | Sept. 23, 1952 |